US009367375B2

(12) United States Patent
Cornes et al.

(10) Patent No.: US 9,367,375 B2
(45) Date of Patent: Jun. 14, 2016

(54) DIRECT CONNECT ALGORITHM

(71) Applicant: Artesyn Embedded Computing, Inc., Tempe, AZ (US)

(72) Inventors: Martin Peter John Cornes, Phoenix, AZ (US); Gary Perkins, Clay Springs, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 145 days.

(21) Appl. No.: 14/251,677

(22) Filed: Apr. 14, 2014

(65) Prior Publication Data

US 2015/0293806 A1 Oct. 15, 2015

(51) Int. Cl.
| | |
|---|---|
| *G06F 11/00* | (2006.01) |
| *G06F 11/07* | (2006.01) |
| *B61H 11/00* | (2006.01) |
| *G06F 11/30* | (2006.01) |
| *B60T 13/66* | (2006.01) |
| *B60T 17/22* | (2006.01) |
| *B61L 15/00* | (2006.01) |
| *B61L 27/00* | (2006.01) |

(52) U.S. Cl.
CPC .......... *G06F 11/0751* (2013.01); *B60T 13/665* (2013.01); *B60T 17/228* (2013.01); *B61H 11/00* (2013.01); *B61L 15/0063* (2013.01); *B61L 27/0061* (2013.01); *G06F 11/0793* (2013.01); *G06F 11/3055* (2013.01)

(58) Field of Classification Search
CPC ............ G06F 11/0751; G06F 11/0793; G06F 11/3055; G06F 11/0709; G06F 11/1608; G06F 11/183; G06F 11/184; G06F 11/185; G06F 11/186; B61H 11/00; B61L 99/00
USPC .............................. 714/47.1, 4.11, 4.2, 11, 25
See application file for complete search history.

(56) References Cited

U.S. PATENT DOCUMENTS

| | | | | | |
|---|---|---|---|---|---|
| 7,047,440 | B1 * | 5/2006 | Freydel | .............. | G05B 19/0428 714/10 |
| 8,166,163 | B2 * | 4/2012 | Ma | ...................... | H04L 43/0817 709/223 |
| 2005/0021606 | A1 * | 1/2005 | Davies | ................ | G06F 11/1456 709/203 |
| 2006/0190702 | A1 * | 8/2006 | Harter | ..................... | G06F 11/10 712/15 |
| 2010/0049268 | A1 * | 2/2010 | Martins | ............... | G06F 11/2025 607/9 |

* cited by examiner

*Primary Examiner* — Joseph D Manoskey
(74) *Attorney, Agent, or Firm* — Harness, Dickey & Pierce, P.L.C.

(57) ABSTRACT

A system includes a safety relevant component that generates a data packet in response to receiving a request to perform a task and that communicates the data packet. The system further includes a first fail-safe chassis (FSC) that continuously generates a first and second chassis health signals, that determines whether the data packet is valid, and that selectively determines whether to de-assert the first and second chassis health signals based on the determination. The system also includes a second FSC that continuously generates a third a fourth chassis health signals, that determines whether a data packet is valid, and that selectively determines whether to de-assert the third and fourth chassis health signals based on the determination. The system includes a direct connect algorithm state machine that determines whether to instruct the one of the first and second FSCs to operate in a predetermined mode based on the chassis health signals.

20 Claims, 4 Drawing Sheets

DIRECT CONNECT ALGORITHM

FIELD

Figure 1:
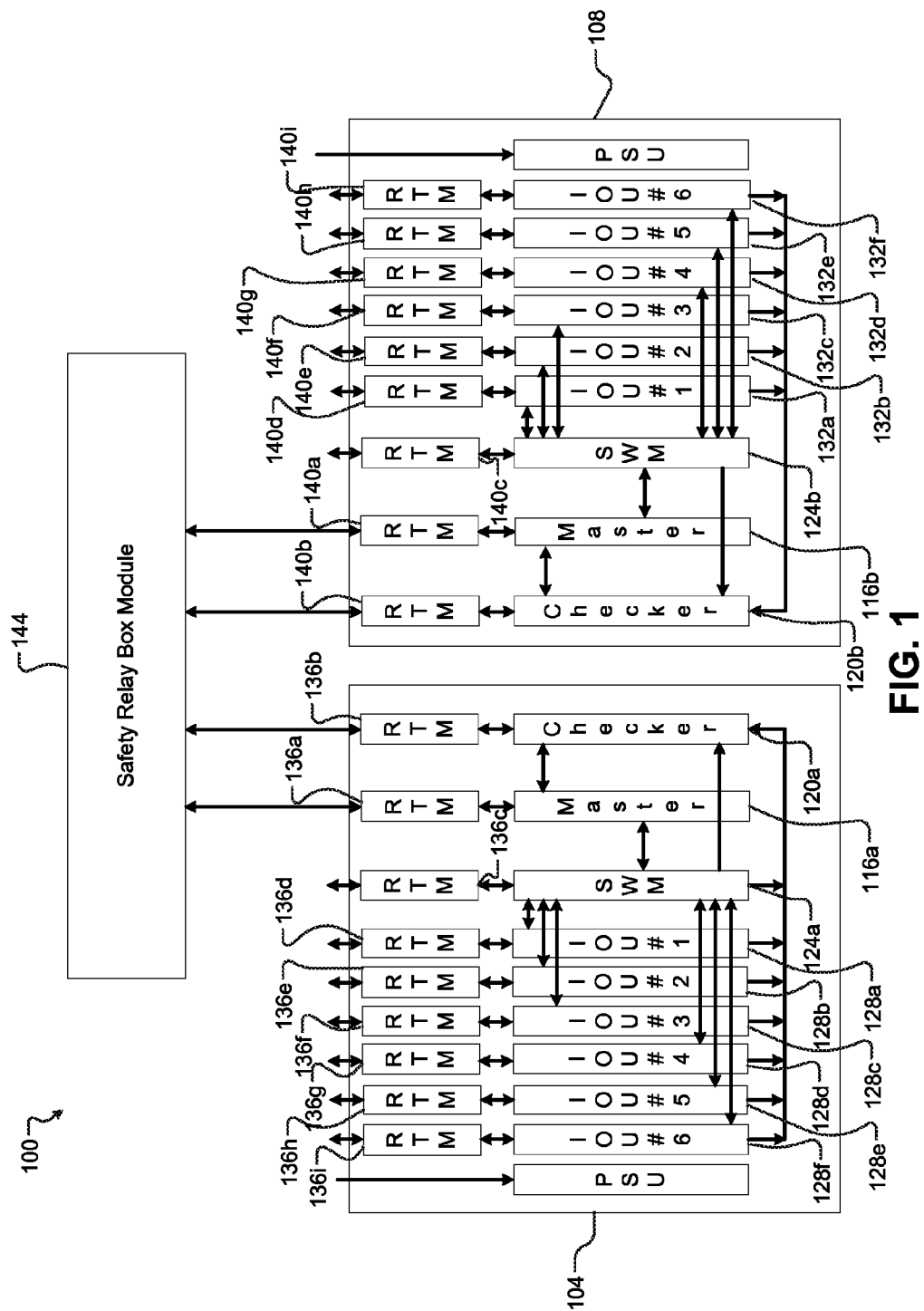

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An external safety system, such as a railway system, may include fault-tolerant failsafe computer systems configured to implement a safety application. The fault-tolerant failsafe computer systems may include a plurality of hardware components electrically and logically coupled in order to implement the safety application. The safety application selectively communicates with safety critical hardware and software. The safety critical hardware and software are configured to control safety relevant functions of the railway system.

For example, a train riding on the railway system includes a braking system. The braking system is configured to implement at least one safety relevant function, such as a braking function. The braking system includes a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

SUMMARY

This section provides a general summary of the disclosure, and is not a comprehensive disclosure of its full scope or all of its features.

A system includes a safety relevant component that a data packet in response to receiving a request to perform a task and that communicates the data packet. The system further includes a first fail-safe chassis (FSC) that continuously asserts a first chassis health signal and second chassis health signal, that determines whether the data packet is valid, and that selectively determines whether to de-assert the first and second chassis health signals based on the determination. The system also includes a second FSC that continuously asserts a third chassis health signal and a fourth chassis health signal, that determines whether the data packet is valid, and that selectively determines whether to de-assert the third and fourth chassis health signals based on the determination. The system further includes a direct connect algorithm state machine that determines whether to instruct the first FSC to operate in a predetermined mode based on the first, second, third, and fourth chassis health signals.

In other features, a method includes generating a data packet in response to receiving a request to perform a task, communicating the data packet, continuously asserting a first, second, third, and fourth chassis health signal, determining whether the data packet is valid, selectively determining whether to de-assert the first, second, third, and fourth chassis health signals based on the determination, and determining whether to instruct a first FSC to operate in a predetermined mode based on the first, second, third, and fourth chassis health signals.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
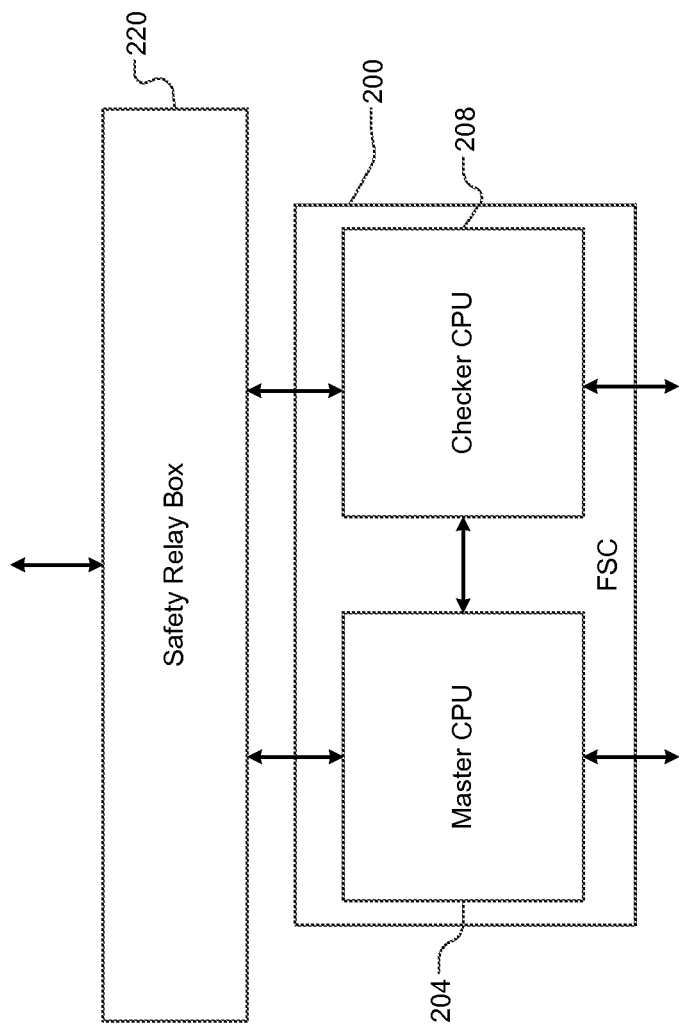
Figure 3:
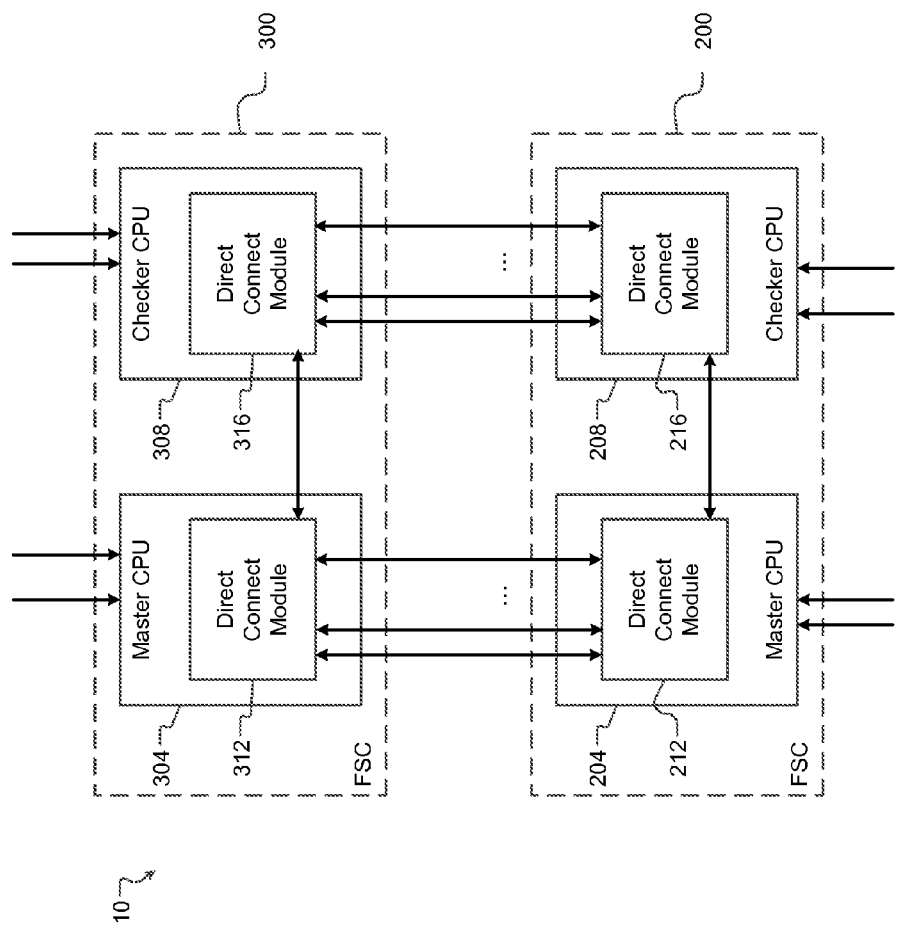
Figure 4:
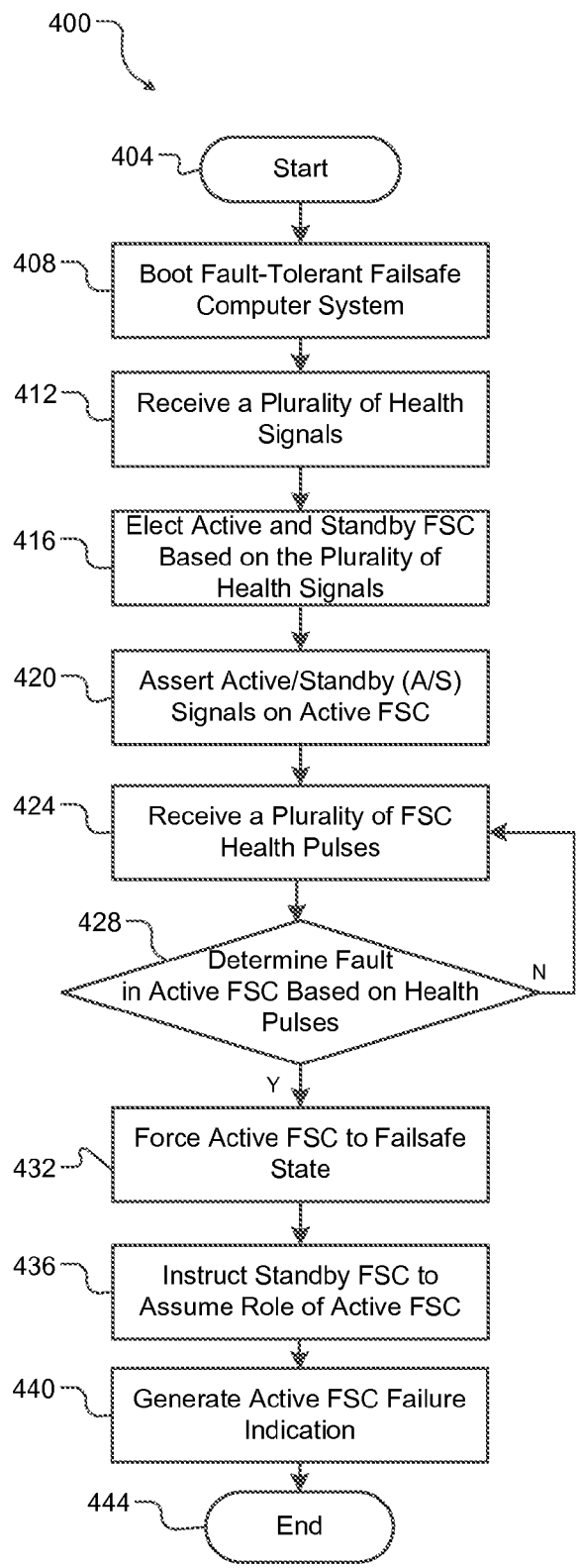

FIG. 1 is a functional block diagram of a fault-tolerant failsafe computer system according to the principles of the present disclosure;

FIG. 2 is a functional block diagram of a fail-safe chassis according to the principles of the present disclosure; and FIG. 3 is a functional block diagram of a system implementing a direct connect algorithm according to the principles of the present disclosure; and FIG. 4 is a flow diagram illustrating a fault-tolerant failsafe computer operating method according to the principles of the present disclosure.

Corresponding reference numerals indicate corresponding parts throughout the several views of the drawings.

DETAILED DESCRIPTION

Example embodiments will now be described more fully with reference to the accompanying drawings.

Referring now to FIG. 1, a functional block diagram of an exemplary fault-tolerant failsafe computer system 100 is shown. The system 100 is arranged to interact with safety applications. For example, the system 100 is arranged to communicate with safety critical hardware and software associated, by way of non-limiting example, a railway system. The safety critical hardware and software control safety relevant components of the railway system. For example, the safety critical hardware may be coupled to a brake system of a train operating on the railway system. Further, the system 100 may be capable of being certified according to an industry recognized safety standard.

The safety critical hardware receives data elements from the safety critical software to actuate a brake of the brake system. The system 100 interfaces with the safety critical hardware and software to ensure the safety critical hardware and software are operating according to a predetermined operating standard. It is understood that while only a brake system of the train is described, the principles of the present disclosure apply to any safety critical hardware and software. Other possible applications for the embodiments described herein include, but are not limited to, components of an airline system, components of a medical treatment system, components of an oil and gas control system, components of a smart grid system, and components of various manufacturing systems.

In some implementations, the system 100 receives a plurality of incoming data packets from an external safety system, such as the railway system. The system 100 is configured to process the plurality of incoming data packets and communicate a plurality of outgoing data packets to safety relevant components of the external safety system. For example, the system 100 determines whether a first packet of the plurality of incoming data packets is a valid packet. When the system 100 determines the first packet is a valid packet, the system 100 communicates an outgoing packet to at least one safety relevant component of the railway system.

The first packet includes data elements to be acted on by the at least one safety relevant component of the railway system. The data elements may include sensor data and/or input/output (I/O) point states. The at least one safety relevant component may be a brake coupled to a train riding on the railway system. It is understood that while only safety relevant components of the external safety system are described, the first packet may include data elements to be acted on by non-safety relevant components of the external safety system. The data elements are formatted according to a transfer protocol. For example, the railway system is configured to package the data elements according to a predetermined packaging standard into transferable packets. The railway system then transfers the plurality of incoming data packets according to the transfer protocol.

The system 100 is arranged to receive packets transmitted according to the transfer protocol. Further, the system 100 is configured to interpret the predetermined packaging standard. The system 100 then extracts the data elements from the first packet and generates an outgoing data packet based on the data elements. The outgoing data packet includes a set of instructions based on the data elements. While only instructions are discussed, the outgoing data packet may also include operating instruction to control I/Os, a request to read an input in order to gather information, health message communications, a request for inter-process communication, or other suitable elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies a brake.

The system 100 determines whether to communicate the outgoing data packet and data elements to the safety critical hardware and software. For example, the system 100 ensures each of the plurality of incoming data packets meet a predetermined safety standard. The predetermined safety standard includes determining whether or not the railway system is operating according to a predefined set of operating standards. The system 100 verifies that each of the plurality of incoming data packets was intentionally transferred by the railway system 100. For example only, the railway system may transfer erroneous incoming data packets due to a hardware or software fault within the railway system.

The safety critical hardware and software receives the first packet of the plurality of incoming data packets in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture. The safety critical hardware and software communicate the plurality of incoming data packets, including the first and second packet, to the system 100. The system 100 is configured to determine whether each of the plurality of incoming data packets was received by the safety critical hardware and software as a result of a fault in the railway system.

When the system 100 determines one of the plurality of incoming data packets was received in response to a command from the operator, the system 100 generates an outgoing data packet corresponding to the received incoming data packet. For example, the system 100 generates a first outgoing data packet based on the first packet. The first outgoing data packet includes a set of instructions corresponding to the data elements within the first packet. When the system 100 determines the first packet is a valid packet, the system 100 communicates the first outgoing data packet to the safety critical hardware and software. For example, the system 100 determines the first packet was received in response to a command from the operator. The system 100 communicates the first outgoing data packet to the safety critical hardware and software. The safety critical hardware and software execute the set of instructions included in the first outgoing data packet.

Conversely, when the system 100 determines one of the plurality of incoming data packets was received in response to a fault within the railway system, the system 100 does not communicate an outgoing data packet to the safety critical hardware and software. For example, the system 100 determines the second packet was received due to a fault in the railway system. The system 100 does not communicate an outgoing data packet corresponding to the second packet to the safety critical hardware and software. Consequently, the safety critical hardware and software do not execute instructions corresponding to data elements included in the second packet.

Further, the system 100 generates a fault indication based on the determination that a fault occurred within the railway system. In this way, data elements executed by the safety critical hardware and software are first verified by the system 100. This verification ensures the railway system is operating according to the predetermined safety standard.

In some implementations, the system 100 receives a first packet of the plurality of incoming data packets. Simultaneously, the system 100 receives a second packet of the plurality of incoming data packets. The system 100 then executes voting logic on the first and second packet. The voting logic may be implemented as a dual two-of-two (2oo2) system. The 2oo2 voting logic is explained in greater detail below. The system 100 determines whether the first and second packets are identical. When the system 100 determines the first and second packets are identical, the system 100 generates a first outgoing data packet and communicates the first outgoing data packet to at least one component of the safety critical hardware and software.

The at least one component then executes operating data elements included within the first outgoing data packet. Conversely, when the first and second packets are not identical, the system 100 identifies at least one component of the system 100 or the railway system as faulty. It is understood that while a railway system is described, the principles of the present disclosure apply to any external safety systems.

The system 100 also generates a safety indication. The safety indication may be indicative of a failure within the system 100 or the safety critical hardware and software. Further, the system 100 instructs the at least one component to operate in a predetermined safe state. For example, the safe state may include a set of safe state data elements arranged to maintain a safe operating environment of the railway system.

The safe state data elements include instructing the railway system to operate in a predetermined operating mode that ensures the overall safety of the railway system. For example only, the predetermined operating mode includes bringing a train operating on the railway system to a stop. In some implementations, the safe state includes disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108. In this way, when one of the active FSC 104 and the standby FSC 108 encounters a hardware or software failure, the other of the active FSC 104 and the standby FSC 108 is configured to operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. The active FSC 104 receives two copies of a first packet of the plurality of incoming data packets.

The active FSC 104 determines the validity of the first packet. The active FSC 104 continuously generates a first health status signal and a second health status signal based on the determination of whether the first packet is valid. In some implementations, continuously generating a signal may include setting the signal to a first predetermined value. The continuously generated signal is then maintained at the first predetermined value until the signal is de-asserted to a second predetermined value.

The active FSC 104 compares each of the two copies of the first packet. When the two copies are identical, the active FSC 104 determines the first packet is valid. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. It is understood that the first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy.

As will be discussed in detail below, the system 100 instructs the active FSC 104 to operate in a safe state in order to maintain the safety of the system 100. It is understood that while only voting mismatches are discussed in relation to the first and second status signals being de-asserted, any hardware or software failure within the system 100 may cause one of the first and second status signals to be de-asserted. The health status signal may indicate the system 100 is operating according to a predetermined operating standard. In this way, the health status signal indicates the system 100 is healthy.

When the active FSC 104 determines that the two copies of the first packet are not identical, the active FSC 104 determines a voting fault has occurred. The active FSC 104 generates a fault signal based on the determination that a voting fault has occurred. The fault signal is indicative of a detected fault within the system 100. The fault may be due to hardware or software failure within the system 100 or the external safety system. For availability reasons, if the active FSC 104 encounters a hardware or software failure, the system 100 forces the active FSC 104 to a predetermined safe state. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in an overall system architecture. For example, the higher-level equipment may be components of a railway braking system of the railway system.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100. For example only, the user interface may implemented as a plurality of light emitting diodes (LEDs).

The communication links communicate with hardware components and software applications external to the system 100. Further, the system 100 is configured to receive input and communicate output to a field engineer. For example, the field engineer may selectively configure the system 100 by communicating with the a user interface of the system 100.

Each of the active FSC 104 and the standby FSC 108 are arranged to execute a health and safety application. For example, the active FSC 104 and the standby FSC 108 include a memory and a processor. The health and safety application may be software loaded into the memory of the active FSC 104 and the standby FSC 108. The health and safety application is then executed by the processor of the active FSC 104 and the standby FSC 108.

The health and safety application monitors and controls the active FSC 104 and the standby FSC 108. For example, the health and safety application generates a plurality of health signals. The plurality of health signals may include, but is not limited to, a module health signal and a mask signal. The health and safety application generates the plurality of signals based on a fault in active FSC 104, for example. The health and safety application is a functional safety subsystem designed to detect and respond to failures by forcing one of the active FSC 104 or the standby FSC 108 to the safe state.

It is understood that the health and safety application may include any safety applications executed on an external safety system. This may include ensuring the validity and safety of a set of data elements prior to the set of data elements being executed by the hardware and software of the railway system. The health and safety application is also configured to ensure the railway system operates in the predetermined safe state when the health and safety application detects a failure in the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116a and the checker CPU 120a execute identical software and implement identical processing functions. The master CPU 116a and the checker CPU 120a are configured to perform identical functions in order to maintain full hardware fault and error detection coverage of the safety critical hardware and software and allow for voting on outgoing packets in the correct sequence.

In some implementations, the master CPU 116a receives a request to perform a task from at least one of the safety critical hardware or software of the railway system. The request to perform a task is based on a command received by the safety critical hardware and software from the operator of the external safety system. For example, the operator of the railway system may command a train riding on the railway system to increase speed. The operator may actuate a physical lever within the train. The physical lever is arranged to generate a signal indicative of the command to increase the speed of the train. The signal is communicated to the safety critical hardware and software.

Prior to executing the command, the safety critical hardware and software communicate the safety relevant task to the system 100. The system 100 is configured to interpret the signal and determine a requested task associated with the signal. The system 100 then determines whether the requested task is indicative of a safety relevant task. For example, the requested task may be a safety relevant task or a non-safety relevant task. In one example, a non-safety relevant task includes instructions that instruct the safety critical hardware and software to return a current status of the train operating within the railway system. In another example, a safety-relevant task includes instructions that instruct the safety critical hardware and software to increase the speed of the train.

The system 100 compares the requested task to a list of predefined tasks. The system 100 determines, based on the predefined tasks, whether the requested task is safety relevant. When system 100 determines the requested task is a safety relevant task, the system 100 generates a packet corresponding to the requested task. It is understood that while only a safety relevant task is described herein, the system 100 may generate a packet from any task. The system 100 communicates the packet to the master CPU 116a. Both the master CPU 116a and the checker CPU 120a are configured to verify the validity of the packet before the safety critical hardware and software execute the requested task. For example, the request to perform a task may be one of the plurality of incoming data packets.

Simultaneously, the checker CPU 120a receives a copy of the same packet corresponding to the requested task. Each of the master CPU 116a and the checker CPU 120a is configured to communicate a copy of the packet to the other of the master CPU 116a and the checker CPU 120a. Prior to the master CPU 116a instructing the safety critical hardware and software to perform the requested task, the master CPU 116a and the checker CPU 120a compare the packet received by each of the master CPU 116a and the checker CPU 120a. For example, the master CPU 116a and the checker CPU 120a perform 2oo2 voting on the packet.

When the packets are identical, the master CPU 116a instructs the safety critical hardware and software to perform the requested task. For example, the master CPU 116a and the checker CPU 120a generates an outgoing packet associated with the requested task. When voting is successful (i.e., the packets are identical) the master CPU 116a communicates the outgoing packet to the safety critical hardware and software to execute the requested task.

The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train.

Conversely, when the packets are not identical, the master CPU 116a and the checker CPU 120a do not instruct the safety critical hardware and software to perform the requested task. The master CPU 116a generates a fault signal. The fault signal is indicative of a failure within the system 100, the safety critical hardware and software, or the external safety system. In this way, the master CPU 116a verifies that the requested task is a valid request from a valid source (i.e., an external hardware component or software application.)

For example only, the master CPU 116a receives erroneous requests to perform tasks due to external hardware failure, a software error, or an overall system malfunction. It is understood that while only the master CPU 116a and the checker CPU 120a are described, the principles described above also apply to the master CPU 116b and the checker CPU 120b.

Each of the active FSC 104 and the standby FSC 108 include a plurality of input/output unit (IOU) modules. The active FSC 104 includes IOU modules 128a-128f. The IOU modules 128a-128f will hereinafter be referred to as the IOU module 128. Similarly, the standby FSC 108 includes IOU modules 132a-132f, which are identical to the IOU modules 128a-128f. The IOU modules 132a-132f will hereinafter be referred to as the IOU module 132.

The active FSC 104 and the standby FSC 108 also each include a voting subsystem, an input/output (I/O) subsystem, and a switch module 124a and a switch module 124b respectively. The switch module 124a and the switch module 124b are configured to be identical. The switch module 124a and the switch module 124*b* route packets received from the I/O subsystem to the master CPUs 116*a* and 116*b* and the checker CPUs 120*a* and 120*b*.

For example, the switch module 124*a* may route a packet received from the master CPU 116*a* to an external network component. Further, the switch module 124*a* receives packets from an external component and routes the received packets to the master CPU 116*a*, the checker CPU 120*b*, and the I/O subsystem. Further, the switch module 124*a* communicates the received packets to the voting subsystem. It should be appreciated that while only the switch module 124*a* is described, the principles described above also apply to the switch module 124*b*.

The IOU module 128 implements the I/O subsystem within the active FSC 104. The I/O system is configured to provide a gateway between lower-level network equipment and the master CPU 116*a* and the checker CPU 120*a*. The IOU module 128 isolates the master CPU 116*a* and the checker CPU 120*a* from low level protocols required by external hardware and software. In this way, the IOU module 128 adds a safety layer on the internal Ethernet to support safe communication between the master CPU 116*a*, checker CPU 120*a*, and the external hardware and software. The IOU module 128 and the switch module 124*a* may be referred to collectively as the front blades 124*a*-128*f*. Similarly, the IOU module 132 and the switch module 124*b* may be referred to collectively as the front blades 124*b*-132*f*.

The active FSC 104 and the standby FSC 108 also include a plurality of rear transition modules (RTMs). The active FSC 104 includes RTMs 136*a*-136*i*. The standby FSC 108 includes RTMs 140*a*-140*i*. It should be appreciated that because the standby FSC 108 is a redundant configuration of the active FSC 104, the RTMs 136*a*-136*i* are identical to the RTMs 140*a*-140*i*. In some implementations, each of the RTMs 136*a*-136*i* may be hot swappable field replaceable units (FRUs).

For example, each of the RTMs 136*a*-136*i* may be removed and replaced by a field engineer without first having to power off the entire system 100. The RTMs 136*a*-136*i* allows the active FSC 104 to communicate with the external hardware and software components. For example, the RTM 136*a* electrically and logically couples the master CPU 116*a* to components external to the active FSC 104. Similarly, the RTM 136*b* electrically and logically couples the standby FSC 108 to external hardware and software components.

The front blades 124*a*-128*f* each includes a first memory location and a second memory location. The first and second memory locations store a value received from a corresponding hardware component of the active FSC 104. For example, the master CPU 116*a* continuously generates a module health signal (described above) indicative of the module health of the master CPU 116*a*. The master CPU 116*a* stores a 1 in the first memory location when the module health signal indicates the master CPU 116*a* is healthy.

Each of the front blades 124*a*-128*f* and the master CPU 116*a* generates a module health signal. Each of the front blades 124*a*-128*f* stores a value indicative of the module health signal in a first memory location. For example only, the switch module 124*a* stores a 1 in a first memory location associated with switch module 124*a* when the module health signal indicates the switch module 124*a* is healthy.

Conversely, the switch module 124*a* stores a 0 in the first memory location when the module health signal indicates the switch module 124*a* is not healthy. It is understood that while only the switch module 124*a* is described, the principles discussed herein apply to all modules within the system 100. It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116*a*.

The master CPU 116*a* determines whether the active FSC 104 is healthy based on receipt of a plurality of values corresponding to the module health signals generated by each of the front blades 124*a*-128*f* and a module health signal generated by the master CPU 116*a*. For example only, the master CPU 116*a* determines that the active FSC 104 is healthy when each of the received values corresponding to the module health signals indicates that each of the modules within the system 100 is healthy. Conversely, the master CPU 116*a* determines that the active FSC 104 is not healthy when at least one of the received values corresponding to the module health signals indicates that at least one of the modules within the system 100 is not healthy.

In another implementation, a value indicative of the module health signal is stored in a module configured at the front of the system 100. For example, a module configured on the opposite side of the system 100 from the RTM 136*s* stores a 1 in the first memory location when the module health signal indications the master CPU 116*a* is healthy. It is understood that while only the master CPU 116*a* is described, the principles described herein apply to the checker CPU 120*a*.

The master CPU 116*a* receives a first packet of the plurality of incoming data packets. Simultaneously, the checker CPU 120*a* receives a copy of the first packet. The master CPU 116*a* and the checker CPU 120*a* determine whether the first packet and the copy of the first packet are identical. When the first packet and the copy of the first packet are identical, the master CPU 116*a* continuously generates a module health signal. The module health signal may be set to 1 or a high signal value. The value of the module health signal is indicative of the health of the active FSC 104. The master CPU 116*a* stores a 1 in the first memory location.

Conversely, when the first packet and the copy of the first packet are not identical, the master CPU 116*a* generates an invalid module health signal. For example, the master CPU 116*a* de-asserts the module health signal. The master CPU 116*a* stores a 0 in the first memory location. The master CPU 116*a* receives a mask signal indicative of the state of the mask register within the master CPU 116*a*. For example, the mask register is a programmable bit within each of the master CPU 116*a* and the checker CPU 120*a*.

The mask register is set when a requested task is a safety-relevant task. For example, the mask register is set to 1 when the system 100 determines the requested task is a safety-relevant task. The RTM 136*a* stores a 1 in the second memory location when the mask signal indicates the mask register within the master CPU 116*a* is set to a 1. Conversely, the RTM 136*a* stores a 0 in the second memory location when the mask signal indicates the mask register within the master CPU 116*a* is set to a 0.

The system 100 also includes a watchdog timer application. The watchdog timer application is a continuously running watchdog function that indicates whether the master CPU 116*a* is has stopped executing code. For example, the watch dog timer application monitors the master CPU 116*a*. The master CPU 116*a* generates a watchdog timer reset signal. The master CPU 116*a* communicates the watchdog timer reset signal to the watchdog timer application. The watchdog timer application determines whether the watchdog timer reset signal was received within a predefined period. For example, the predefined period may be 1 minute. The predefined period may be a configurable item.

The watchdog timer application generates a watchdog health signal based on the watchdog timer reset signal. For example, when the master CPU 116a communicates a watchdog timer reset signal after the predefined period, the watchdog timer application sets the watchdog health signal to 0. Conversely, when the master CPU 116a communicates the watchdog timer reset signal within the predefined period, the watchdog timer application sets the watchdog health signal to 1. In other words, the watchdog timer application determines a fault in the master CPU 116a when the master CPU 116a is incapable of communicating with the watchdog application within the predefined period. For example, the fault may be as a result of the master CPU 116a being stuck in a software loop. It is understood that while the only master CPU 116a is described above, the checker CPU 120a is configured to identical tasks as the master CPU 116a.

The RTM 136a communicates a module health value indicative of the overall health of the master CPU 116a. For example, the RTM 136a is configured to perform a logical OR on the value stored in the first memory location and the value stored in the second memory location. For example, when the value stored in the first memory location is 0 and when the value stored in the second memory location is 0 the RTM 136a will a communicate a module health value of 0.

When the value stored in the first memory location is 1 and the value stored in the second memory location is a 0, the RTM 136a communicates a module health value of 1. It is understood that each of the RTMs 136a-136i is configured to perform a logical OR on values stored within memory of associated with each of the front blades 124a-128f.

The RTMs 136a and 136b communicate a chassis health value to the safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136a, RTM 136b, RTM 140a, and RTM 140b. The RTM 136a generates a first chassis health value based on the cumulative result of the module health signals generated by the master CPU 116a and the front blades 124a-128f and a value stored in the mask registers.

The RTM 136a communicates the chassis health value to the safety relay box module 144. Similarly, the RTM 136b generates a second chassis health value based the cumulative result of the module health signals generated by the checker CPU 120a and the front blades 124a-128f and a value stored in the mask registers. The RTM 140a generates a third chassis health value based on the cumulative result of the module health signals generated by the master CPU 116b and the front blades 124b-132f and a value stored in the mask registers. Similarly, the RTM 140b generates a fourth chassis health value based on the cumulative result of the module health signals generated by the checker CPU 120b and the front blades 124b-132f and a value stored in the mask registers.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136a and 136b. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter the failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

In some implementations, the safety relay box module 144 is configured to communicate with a plurality of commercial off the shelf (COTS) products. For example, the active FSC 104 and the standby FSC 108 may be COTS products implemented within the system 100. The active FSC 104 and the standby FSC 108 are configured according to a predetermined implementation standard. The implementation standard includes a predefined communication protocol.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100. Further, any component within the system 100 may be implemented utilizing COTS products so long as the any component follows the communication protocol.

In some implementations, the I/O subsystem also receives packets from external sources such as hardware and software components of the rail system. The received packets may include the plurality of incoming data packets as discussed above. The I/O subsystem then communicates the received packets to the voting subsystem.

The voting subsystem is a functional safety subsystem and is configured to detect and respond to failures. When the voting subsystem detects an error in one of the active FSC 104 and the standby FSC 108, the voting subsystem forces the one of the active FSC 104 and the standby FSC 108 to the failsafe state. The voting subsystem performs fault detection of the processing subsystem. For example, the master CPU 116a and the checker CPU 120a generate outgoing packets based on a requested task.

The voting subsystem compares the outgoing packets generated by the mater CPU 116a to the outgoing packets generated by the checker CPU 120a. When the outgoing packets are identical, the voting subsystem communicates a single copy of a packet to the switch module 124a and to the I/O subsystem. When the outgoing packets are not identical, the voting subsystem forces the active FSC 104 to the failsafe state. In this way, the voting subsystem detects faults in one of the active FSC 104 and the standby FSC 108. Upon detecting a fault in the one of the active FSC 104 and the standby FSC 108, the voting subsystem brings the system 100 to a safe state by forcing the faulty FSC to the failsafe state.

The voting subsystem also receives packets from the I/O subsystem. For example, the IOU modules 128 communicate with the voting subsystem via the switch modules 124a. The IOU modules 128 communicate a first packet to switch module 124a. The switch module 124a duplicates the first packet. For example, the switch module 124a generates a second packet. The second packet is a copy of the first packet. The switch module 124a communicates the first packet to the master CPU 116a and the checker CPU 120a. The master CPU 116a and the checker CPU 120a executing voting logic on the first and second packets as described above. In this way, the voting subsystem verifies the validity of the received packets.

In another example, the first packet may not be identical to the second packet due to a hardware malfunction in an external component, such as the safety critical hardware of the rail system. When the voting subsystem determines the first packet is not identical to the second packet, the safety application forces the active FSC 104 to the failsafe state. Additionally or alternatively, the mismatched packets may be silently discarded. For example, neither the master CPU 116a nor the checker 120a generates an outgoing packet based on the first and second packet. In this way, the system 100 may avoid excessive failover/failsafe transitions due to otherwise recoverable errors. In another implementation, input voting may be configured to result in failover/failsafe transition.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an external safety system. The external safety system may be a system that is required to operate according to a predetermined safety standard, such as a railway system. The railway system includes safety critical hardware and software. The safety critical hardware and software interact with components of the railway system in order to control aspects of the railway system. For example, the safety critical hardware and software controls a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software. For example, the master CPU 204 and the checker CPU CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application.) For example only, the master CPU 204 receives erroneous requests to perform tasks due to external hardware failure, a software error, or an overall system malfunction.

The master CPU 204 and the checker CPU 208 include a mask register. The mask register is a programmable bit within the master CPU 204 and the checker CPU 208. A value stored in the mask register is indicates whether a requested task is a safety-relevant task. For example, the mask register is set to 1 when the system 100 determines a requested task is a safety-relevant task. Further, the health and safety application sets the mask register when the system 100 is initially started.

The master CPU 204 and checker CPU 208 each continuously generate a module health signal based on a determination of whether the requests tasks are identical. When the master CPU 204 and the checker CPU 208 determine the requested tasks are identical, the master CPU 204 and the checker CPU 208 continuously generate the module health signal pulse. When the master CPU 204 and the checker CPU 208 determine the requested tasks are not identical, the master CPU 204 and the checker CPU 208 de-assert the module health signal pulse.

The master CPU 204 and the checker CPU 208 generate a chassis health signal pulse based on a plurality of module health signal pulses generated by each of a plurality of modules associated with the FSC 200. The FSC 200 includes similar features as those described with respect to the active FSC 104. For example, the FSC 200 includes the front blades 124a-128f as described above. Each of the modules within the FSC 200 continuously generates a module health signal (as described above). The master CPU 204 generates a first chassis health signal pulse when the plurality of module health signals indicates the FSC 200 is healthy. In other words, the first chassis health signal pulse is continuously asserted (i.e., set to 1) when the mask register indicates the requested task is safety relevant and the plurality of module health signals indicate the FSC 200 is healthy.

It is understood that when the mask register indicates the requested task is not safety relevant (i.e., the mask register is set to 0) the first module health signal pulse may be de-asserted. However, safety relevant procedures (i.e., forcing the active FSC 204 to a safe state) will not be executed. In this way, failover/failsafe procedures are only implemented when a fault occurs during a safety relevant task. The chassis health signal pulse is indicative of the overall health of the FSC 200.

It is understood that principles described with respect to the master CPU 204 apply to the checker CPU 208. The checker CPU 208 generates a second chassis health signal pulse based on a plurality of module health signal pulse generated by each of a plurality of modules associated with the FSC 200. The checker CPU 208 continuously generates the second chassis health signal pulse when the plurality of module health signals indicates the FSC 200 is healthy. The master CPU 204 communicates a first chassis health signal pulse to a safety relay box 220. Similarly, the checker CPU 208 communicates a second chassis health signal pulse to a safety relay box 220.

The safety relay box 220 selectively determines whether the FSC 200 will operate as an active FSC based on a plurality of chassis health signals. For example, the safety relay box 220 begins receiving a chassis health signal pulse from the master CPU 204 when the FSC 200 is initiated. The safety relay box 220 also begins receiving a chassis health signal pulse from the checker CPU 208. The safety relay box 220 determines whether the FSC 200 will be elected as the active FSC based on the chassis health signals.

In some implementations, the safety relay box 220 also receives a plurality of chassis health signal pulses from another FSC. The safety relay box 220 determines whether the FSC 200 or the other FSC will be elected as the active FSC based on the plurality of chassis health signal pulses. For example, the safety relay box 220 first determines whether one of the FSC 200 or the other FSC is healthy. The safety relay box 220 determines the FSC 200 is healthy when the chassis health signal pulses received from the FSC 200 indicate the FSC 200 is healthy. For example, the safety relay box 220 determines the FSC 200 is healthy when the safety relay box 220 receives a chassis health signal from the FSC 200.

Similarly, the safety relay box 220 determines the other FSC is healthy when the plurality of chassis health signal pulses received from the other FSC indicate the other FSC is healthy. When safety relay box 220 determines that both of the FSC 200 and the other FSC are healthy, the safety relay box 220 elects an active FSC based on which of the FSC 200 and the other FSC communicated one of the plurality of chassis health signal pulses first. For example, when the FSC 200 communicates a signal to the safety relay box 220 before the other FSC communicates a signal to the safety relay box 220, the safety relay box 220 elects the FSC 200 as the active FSC.

The safety relay box 220 monitors the health of the active FSC. For example, the safety relay box 220 receives the first and second chassis health signal pulses from the FSC 200. The safety relay box 220 determines whether a fault has occurred in the FSC 200 based on the first and second chassis health signal pulses. The safety relay box 220 determines a fault has occurred in the FSC 200 when at least one of the first and second chassis health signal pulses is indicative of a mismatch of the requested tasks. In other words, the safety relay box 220 determines a fault has occurred when the safety relay box 220 does not receive one of the first and second chassis health signal pulses.

The safety relay box 220 generates a failsafe signal when the safety relay box 220 determines a fault has occurred in the FSC 200. The safety relay box 220 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box 220 communicates the active signal when the safety relay box 220 determines the FSC 200 is to operate as the active FSC. The safety relay box 220 continuously communicates the active signal to the FSC 200. When the safety relay box 220 determines the FSC 200 is faulty, the safety relay box 220 does not communicate an active signal to the FSC 200. The FSC 200 then operates in the standby state.

In some implementations, the plurality of chassis health signal pulses are implemented as dynamic pulse signals to eliminate undetected, latent failure modes. The safety relay box 220 is configured to determine whether a pulse signal is stuck at 0 or stuck at 1. For example, the safety relay box 220 receives a first pulse signal from the master CPU 204. The safety relay box 220 is configured to wait a predetermined period of time.

For example, the predetermined period of time may be a period corresponding to a time long enough for a dynamic pulse to reset. The safety relay box 220 determines the first pulse signal is stuck when the first pulse signal has not been reset after the predetermined period. The safety relay box 220 determines a fault in the master CPU 204 when then safety relay box 220 determines the first pulse signal is stuck. The safety relay box 220 generates a failsafe signal based on determining a fault in the master CPU 204.

Referring now to FIG. 3 a block diagram of a direct connect algorithm (DCA) system 10 illustrating an alternative failsafe chassis (FSC) 200 and an FSC 300 implementing a direct connect algorithm according to the principles of the present disclosure is shown. The FSC 200 includes the master CPU 204 and the checker CPU 208 as described above. The FSC 300 includes a master CPU 304 and a checker CPU 308.

In some implementations, the FSC 200 and the FSC 300 implement a DCA. The DCA controls active/standby FSC election. For example, the DCA elects an FSC as active based on the first FSC to assert two chassis health signals. The DCA determines whether an FSC should be failed over. For example, when an active FSC becomes unhealthy (as described above) and a standby FSC is healthy, the DCA instructs the active FSC to act as the standby FSC and the standby FSC to act as the active FSC. The DCA may instruct both the active FSC and standby FSC to act as standby FSCs when the DCA determines both the active FSC and standby FSC are unhealthy. Further, the DCA may receive instructions from a field engineer to instruct one or both FSCs to act as a standby FSC during maintenance on the FSC 200 and FSC 300.

The DCA is a four-way distributed, asynchronous, self-checking algorithm. For example, the algorithm is executed by four, physically distinct, CPU modules simultaneously. The algorithm is not synchronized to a reference clock. The DCA is self-checking. For example, each pair of CPU modules within an FSC must agree before allowing an FSC to be elected as an active FSC. Further, all failures within the system 100 are detected by the self-checking, dual redundant CPU modules. Each CPU module monitors state information received from all four CPU modules and controls the state of its own active output, as described in greater detail below.

As described with respect to FIG. 2, the master CPU 204 and the checker CPU 208 generate a chassis health signal based on a plurality of module health signals generated by each of a plurality of modules associated with the FSC 200. For example, the FSC 200 includes the front blades 124a-128f as described above. Each of the modules within the FSC 200 continuously generates a module health signal (as described above).

The master CPU 204 continuously generates a first chassis health signal when the plurality of module health signals indicates the FSC 200 is healthy. The checker CPU 208 generates a second chassis health signal based on a plurality of module health signals generated by each of a plurality of modules associated with the FSC 200. The checker CPU 208 continuously generates the second chassis health signal when the plurality of module health signals indicates the FSC 200 is healthy.

Similarly, the master CPU 304 and the checker CPU 308 generate a chassis health signal based on a plurality of module health signals generated by each of a plurality of modules associated with the FSC 300. For example, as described above the FSC 300 may include the front blades 124b-132f. Each of the modules within the FSC 300 continuously generates a module health signal.

The master CPU 304 continuously generates a third chassis health signal when the plurality of module health signals indicates the FSC 300 is healthy. The checker CPU 308 generates a fourth chassis health signal based on a plurality of module health signals generated by each of a plurality of modules associated with the FSC 300. The checker CPU 308 continuously generates the fourth chassis health signal when the plurality of module health signals indicates the FSC 300 is healthy.

In the example implementation, the system 10 includes a DCA state machine. The DCA state machine is comprised of a plurality of direct connect modules within each of the CPU modules within the system 100. For example, the master CPU 204 includes a direct connect module 212, the checker CPU 208 includes a direct connect module 216, the master CPU 304 includes a direct connect module 312, and the checker CPU 308 includes a direct connect module 316. In other words, the DCA state machine includes the direct connect modules 212, 216, 312, and 316. As will be explained in greater detail below, the direct connect module 212 and the direct connect module 312 exchange a plurality of signals related to the health of the FSC 200 and FSC 300. Similarly, the direct connect module 216 and the direct connect module 316 exchange a plurality of signals related to the health of the FSC 200 and the FSC 300.

In some implementations, the direct connect module 212 communicates the first chassis health signal to the direct connect module 312. Similarly, the direct connect module 312 communicates the third chassis health signal to the direct connect module 212. Further, the direct connect module 216 communicates the second chassis health signal to the direct connect module 316. Similarly, the direct connect module 316 communicates the fourth chassis health signal to the direct connect module 216.

In some implementations, each of the direct connect modules generates a primary signal. For example, each of the CPU modules includes an associated memory. An identifier associated with each CPU may be stored within the memory. For example, the identifier associated with the master CPU 204 and the master CPU 304 may indicate that the master CPU 204 and the master CPU 304 are primary A CPUs. Similarly, the identifier associated with the checker CPU 208 and the checker CPU 308 may indicate that the checker CPU 208 and the checker CPU 308 are primary B CPUs.

Each direct connect module generates a primary signal based on the identifier associated with each of the CPU modules. For example, the direct connect module 212 generates a first primary A signal based on the identifier associated with the master CPU 204 and communicates the first primary A signal to the direct connect module 312. Similarly, the direct connect module 312 generates a second primary A signal based on the identifier associated with the master CPU 304 and communicates the second primary A signal to the direct connect module 212.

The direct connect module 212 may de-assert the first chassis health signal based on whether the direct connect module 212 received the second primary A signal. For example, the direct connect module 212 generates the first primary A signal. The direct connect module 212 does not receive the second primary A signal. When the direct connect module 212 does not receive the second primary A signal, the direct connect module 212 de-asserts the first chassis health signal. It is understood that the direct connect module 312 may de-assert the third chassis health signal upon not receiving the first primary A signal.

The direct connect module 216 generates a primary B signal and based on the identifier associated with the checker CPU 208 and communicates the primary B signal to the direct connect module 316. Similarly, the direct connect module 316 generates a primary B signal based on the identifier associated with the checker CPU 308 and communicates the primary B signal to the direct connect module 216.

The direct connect module 216 may de-assert the second chassis health signal based on whether the direct connect module 216 received the second primary B signal. For example, the direct connect module 216 generates the first primary B signal. The direct connect module 216 does not receive the second primary B signal. When the direct connect module 216 does not receive the second primary B signal, the direct connect module 216 de-asserts the third chassis health signal. It is understood that the direct connect module 316 may de-assert the fourth chassis health signal upon not receiving the first primary B signal.

In some implementations, the direct connect modules determine whether the system 10 communicates with a safety relay box, such as the safety relay box 220. For example, each of the FSC 200 and the FSC 300 are electrically coupled to a mode cable that is electrically coupled to a grounded source. In one implementation, when the mode cable is connected to ground (e.g., the wire is coupled to a grounded source), the FSC 200 and the FSC 300 utilize the DCA. Alternatively, when the mode cable is not electrically coupled to a grounded source, the FSC 200 and the FSC 300 utilize the safety relay box 220.

In the example implementation, the direct connect module 212 generates a first mode signal based on whether the mode cable is connected to a grounded source. The direct connect module 216 generates a second mode signal based on whether the mode cable is connected to a grounded source. For example, a direct connect module generates a mode signal when the mode cable is connected to a grounded source. Alternatively, a direct connect module does not generate a mode signal when the mode cable is not connected to a grounded source. The direct connect module 312 generates a third mode signal based on whether the mode cable is connected to a grounded source. Similarly, the direct connect module 316 generates a fourth mode signal based on whether the mode cable is connected to a grounded source.

The direct connect module 212 and the direct connect module 216 exchange the first and second mode signals. Similarly, the direct connect module 312 and the direct connect module 316 exchange the third and fourth mode signals. The direct connect module 212 determines whether to de-assert the first chassis health signal based on the first and second mode signals. For example, the direct connect module 212 de-asserts the first chassis health signal when the first and second mode signals are not the same. In other words, the direct connect module 212 de-asserts the first chassis health signal when one of the direct connect module 212 and the direct connect module 216 generate do not receive the same input from the mode cable.

Similarly, the direct connect module 312 determines whether to de-assert the first chassis health signal based on the first and second mode signals. For example, the direct connect module 312 de-asserts the first chassis health signal when the first and second mode signals are not the same. In other words, the direct connect module 312 de-asserts the first chassis health signal when one of the direct connect module 312 and the direct connect module 316 does not receive the same input from the mode cable.

In some implementations, the DCA state machine selectively determines which of FSCs within the system 10 will be the active FSC and which will be the standby FSC based on a plurality of chassis health values. For example, each of the direct connect modules 212, 216, 312, and 316 receives a plurality of chassis health values from the each of the direct connect modules 212, 216, 312, and 316. As described above, each of the direct connect modules 212, 216, 312, and 316 generates a plurality of signals.

Further, each of the direct connect modules 212, 216, 312, and 316 communicates the plurality of signals to an associated direct connect module pair. For example, the direct connect module 212 and the direct connect module 312 are direct connect module pairs. Further, the direct connect module 216 and the direct connect module 316 are direct connect module pairs. It is also understood that the direct connect module 212 may communicate with the direct connect module 216. Further, the direct connect module 312 may communicate with the direct connect module 316.

The DCA state machine determines which of the FSC 200 and the FSC 300 will operate as an active FSC within the system 10. For example, the DCA state machine determines the FSC 200 will operate as the active FSC within the system 10 based the first-fourth chassis health values. The DCA state machine determines the FSC 200 will be the active FSC within the system 10 when the first and second chassis health signals indicate the active FSC 200 is healthy.

The DCA state machine generates an active FSC signal and a standby FSC signal based on the active FSC determination. For example, the DCA state machine determines the FSC 200 will act as the active FSC. The direct connect module 212 may generates a first active FSC signal and a second active FSC signal. The first and second active FSC signals are redundant signals that are both indicative of which FSC is elected to operate as the active FSC.

The DCA state machine also generates a first standby FSC signal and a second standby FSC signal. For example, the DCA state machine determines the FSC 300 will act as the standby FSC. The direct connect module 312 may generates the first and second standby FSC signals are redundant signals that are both indicative of which FSC was elected to operate as the standby FSC. The direct connect module 212 communicates the first and second active FSC signals to the direct connect module 312 and the direct connect module 312 communicates the first and second standby FSC signals to the direct connect module 212.

In some implementations, the DCA state machine is configured to ensure that both the FSC 200 and the FSC 300 do not go active simultaneously. By way of non-limiting example only, the DCA state machine may elect the FSC 200 as the active FSC based on the direct connect module 212 generating the first chassis health signal prior to the second, third, and fourth chassis health signals being generated.

In some implementations, the DCA state machine is configured to ensure the FSC 300 becomes the active FSC based on a maximum condition rule. In some instances, a one of the signals described above may be generated as a result of a hardware failure within the system 100. In the example implementation, the DCA state machine is configured to ensure that a single failure within the system 100 will not force an active FSC to failover.

For example only, the DCA state machine may instruct the FSC 300 to act as an active FCS when the first mode signal is generated, the second mode signal is generated, the third and fourth chassis health signals indicate the FSC 300 is healthy, the first and second chassis health signals indicate the FSC 200 is unhealthy, the first and second primary A signals are generated, and the first and second primary B signals are generated. In other words, the DCA state machine requires all signals described above to be generated in order to failover a previously elected active FCS.

Referring now to FIG. 4 a method 400 for implementing a fault-tolerant failsafe computer system implementing a direct connect algorithm (DCA) state machine begins at 404. At 408, the method 400 initializes the fault-tolerant failsafe computer system. At 412, the method 400 receives a plurality of heath signals. At 416, the method 400 elects an active fail-safe chassis (FSC) and a standby FSC based on the plurality of health signals. For example, the DCA state machine elects the active FSC based on the first-fourth chassis health signals generated by the direct connect modules 212, 216, 312, and 316. At 420, the method 400 asserts an active elect signal and a standby elect signal. The method 400 communicates the active elect signal and the standby elect signal to the active FSC and the standby FSC. At 424, the method 400 receives a plurality of FSC health pulses. For example, each of the direct connect modules 212, 216, 312, and 316 exchange chassis health signals. At 428, the method 400 determines whether a fault occurred in the active FSC based on the health pulses. For example, the DCA state machine determines a fault occurred in an active FSC when at least one of the first-fourth chassis health signals is not generated. When the method 400 determines a fault occurred in the active FSC, the method 400 continues at 430. When the method 400 determines no fault occurred in the active FSC, the method 400 continues to monitor the first-fourth chassis health pulses at 424. At 432, the method 400 forces the active FSC to a failsafe state. At 436, the method 400 instructs the standby FSC to assume the role of the active FSC. At 440, the method 400 generates an active FSC failure indication. The method 400 ends at 444.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
a safety relevant component that generates a data packet in response to receiving a request to perform a task and that communicates the data packet;
a first fail-safe chassis (FSC) that:
continuously asserts a first chassis health signal and a second chassis health signal;
determines whether a data packet is valid; and
selectively determines whether to de-assert the first chassis health signal and the second chassis health signal based on the determination;
a second FSC that:
continuously asserts a third chassis health signal and a fourth chassis health signal;
determines whether a data packet is valid; and
selectively determines whether to de-assert the third chassis health signal and the fourth chassis health signal based on the determination; and
a direct connect algorithm (DCA) state machine that determines whether to instruct the first FSC to operate in a predetermined mode based on the first chassis health signal, second chassis health signal, third chassis health signal, and the fourth chassis health signal.

2. The system of claim 1 wherein the first FSC includes a first master CPU that receives a first copy of the data packet and a first checker CPU that receives a second copy of the data packet.

3. The system of claim 2 wherein the first master CPU communicates the first copy to the first checker CPU and the first checker CPU communicates the second copy to the first master CPU.

4. The system of claim 3 wherein the first master CPU de-asserts the first chassis health signal based on a first comparison between the first copy and the second copy and wherein the first checker CPU de-asserts the second chassis health signal based on a second comparison between the first copy and the second copy.

5. The system of claim 1 wherein the second FSC includes a second master CPU that receives a data packet and a second checker CPU that receives a data packet.

6. The system of claim 5 wherein the second master CPU communicates a copy to the second checker CPU and the second checker CPU communicates a copy to the second master CPU.

7. The system of claim 6 wherein the second master CPU de-asserts the third chassis health signal based on a first comparison between the two copies and wherein the second checker CPU de-asserts the fourth chassis health signal based on a second comparison between two copies.

8. The system of claim 1 wherein the DCA state machine instructs the first FSC to operate as an active FSC in response to the first, second, third, and fourth chassis health signals being asserted.

9. The system of claim 8 wherein the DCA state machine instructs the first FSC to operate in a safe state in response to least one of the first and second chassis health signals being de-asserted.

10. The system of claim 9 wherein the DCA state machine instructs the second FSC to operate as the active FCS.

11. A method comprising:
generating a data packet in response to receiving a request to perform a task;
communicating the data packet;
continuously asserting a first chassis health signal;
continuously asserting a second chassis health signal;
continuously asserting a third chassis health signal;
continuously asserting a fourth chassis health signal;
determining whether the data packet is valid selectively determining whether to de-assert the first, second, third, and fourth chassis health signals based on the determination; and
determining whether to instruct a first FSC to operate in a predetermined mode based on the first, second, third, and fourth chassis health signals.

12. The method of claim 11 further comprising receiving a first copy of the data packet and a second copy of the data packet.

13. The method of claim 12 further comprising de-asserting the first chassis health signal based on a first comparison between the first copy and the second copy.

14. The method of claim 13 further comprising de-asserting the second chassis health signal based on a second comparison between the first copy and the second copy.

15. The method of claim 11 further comprising receiving a data packet and a copy of the data packet.

16. The method of claim 15 further comprising further comprising de-asserting the third chassis health signal based on a first comparison between a third copy and a fourth copy.

17. The method of claim 16 further comprising de-asserting the fourth chassis health signal based on a second comparison between the third copy and the fourth copy.

18. The method of claim 11 further comprising instructing a first FSC to operate in the predetermined mode in response to the first, second, third, and fourth chassis health signals being asserted.

19. The method of claim 11 further comprising instructing a first FSC to operate in a safe state in response at least one of the first and second chassis health signals being de-asserted.

20. The method of claim 19 further comprising instructing a second FSC to operate in the predetermined mode.

* * * * *